US011354730B2

(12) United States Patent
Benkreira et al.

(10) Patent No.: US 11,354,730 B2
(45) Date of Patent: *Jun. 7, 2022

(54) SYSTEMS AND METHODS FOR IDENTIFYING LOCATION-BASED INFORMATION ASSOCIATED WITH A PRODUCT ON A WEB PAGE

(71) Applicant: Capital One Services, LLC, McLean, VA (US)

(72) Inventors: Abdelkader Benkreira, New York, NY (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/099,381

(22) Filed: Nov. 16, 2020

(65) Prior Publication Data
US 2021/0158433 A1 May 27, 2021

Related U.S. Application Data

(63) Continuation of application No. 16/695,752, filed on Nov. 26, 2019, now Pat. No. 10,839,453.

(51) Int. Cl.
*G06Q 30/06* (2012.01)
*G06Q 10/08* (2012.01)
(Continued)

(52) U.S. Cl.
CPC ....... *G06Q 30/0643* (2013.01); *G06F 16/958* (2019.01); *G06F 16/9537* (2019.01);
(Continued)

(58) Field of Classification Search
None
See application file for complete search history.

(56) References Cited

U.S. PATENT DOCUMENTS 7,027,999 B2   4/2006   Smith
7,720,850 B2   5/2010   Lu
(Continued)

FOREIGN PATENT DOCUMENTS

WO    WO2018193466 A1    10/2018

OTHER PUBLICATIONS

Anon., "H.H. Munro (Saki)," https://americanliterature.com/author/hh-munro-saki, downloaded Jan. 21, 2020. (Year: 2020).*
(Continued)

*Primary Examiner* — Nicholas D Rosen
(74) *Attorney, Agent, or Firm* — Bookoff McAndrews, PLLC

(57) ABSTRACT

Disclosed are systems and methods for identifying location-based information associated with a product on a web page. The method may include: detecting user navigation by the user of the web page; detecting the at least one product on the web page; identifying one or more merchants having the detected at least one product in stock; determining a user location of the user; determining the identified one or more merchants having the detected at least one product in stock and having a location within a predetermined distance of the user location; generating a list of merchants, the list including the determined one or more merchants having the detected at least one product in stock and having the location within the predetermined distance of the user location; and executing a browser extension to display, on the web page associated with the at least one product, the generated list of merchants.

20 Claims, 5 Drawing Sheets

(51) Int. Cl.
*G06Q 30/02* (2012.01)
*G06F 16/9537* (2019.01)
*G06F 16/9538* (2019.01)
*G06F 16/958* (2019.01)
*G06F 16/957* (2019.01)

(52) U.S. Cl.
CPC ...... *G06F 16/9538* (2019.01); *G06F 16/9577* (2019.01); *G06Q 10/087* (2013.01); *G06Q 30/0205* (2013.01); *G06Q 30/0631* (2013.01); *G06Q 30/0639* (2013.01)

(56) References Cited

U.S. PATENT DOCUMENTS

| | | | |
|---|---|---|---|
| 7,945,484 | B1 | 5/2011 | Tam |
| 8,326,698 | B1 | 12/2012 | Tam |
| 8,527,367 | B2 | 9/2013 | Blank |
| 9,064,277 | B2 | 6/2015 | Wong et al. |
| 9,070,147 | B2 | 6/2015 | Bank et al. |
| 9,141,987 | B2 | 9/2015 | Perks et al. |
| 9,412,101 | B1 | 8/2016 | Blank et al. |
| 9,996,815 | B2 | 6/2018 | Chin |
| 10,169,321 | B2 | 1/2019 | Trivedi et al. |
| 10,332,176 | B2 | 6/2019 | Gadre et al. |
| 10,529,007 | B2 | 1/2020 | Salvatore |
| 10,713,638 | B2 * | 7/2020 | Miyata ................. G06Q 20/209 |
| 10,824,987 | B2 * | 11/2020 | Kliper ................. G06Q 20/202 |
| 10,839,453 | B1 * | 11/2020 | Benkreira ......... G06Q 30/0631 |
| 11,127,023 | B2 * | 9/2021 | Benkreira ......... G06Q 30/0202 |
| 2002/0147631 | A1 | 10/2002 | Smith et al. |
| 2005/0177401 | A1 | 8/2005 | Koeppel et al. |
| 2007/0276880 | A1 | 11/2007 | Lu |
| 2009/0012704 | A1 | 1/2009 | Franco et al. |
| 2011/0238474 | A1 | 9/2011 | Carr et al. |
| 2012/0123673 | A1 | 5/2012 | Perks |
| 2012/0191565 | A1 | 7/2012 | Blank et al. |
| 2012/0278205 | A1 | 11/2012 | Chin |
| 2012/0316989 | A1 | 12/2012 | Wong |
| 2013/0238464 | A1 | 9/2013 | Bank |
| 2014/0058886 | A1 | 2/2014 | Gopalarkishnan |
| 2014/0188658 | A1 | 7/2014 | Li et al. |
| 2014/0282218 | A1 | 9/2014 | Kaufman et al. |
| 2015/0206165 | A1 | 7/2015 | Cummins et al. |
| 2015/0309971 | A1 | 10/2015 | Cowley |
| 2016/0063588 | A1 | 3/2016 | Gadre et al. |
| 2016/0140490 | A1 | 5/2016 | Kliper |
| 2016/0140532 | A1 | 5/2016 | Kliper et al. |
| 2016/0180436 | A1 | 6/2016 | Arana |
| 2018/0039615 | A1 | 2/2018 | Trivedi et al. |
| 2018/0158132 | A1 | 6/2018 | Salvatore |
| 2019/0130378 | A1 | 5/2019 | Miyata |

OTHER PUBLICATIONS

Anon, "H.H. Munro (Saki)," https://americanliterature.com/author/hh-munro-saki, downloaded Jan. 21, 2010. (Year 2020).

Munro, H.H. (Saki), "The Sex That Doesn't Shop," https://americanliterature.com/author/hh-munro-saki/short-story/the-sex-that-doesnt-shop, downloaded Jan. 21, 2020 (Year: 2020).

Anon., "AT&T Interactive; yellowpages.com Makes Shopping Easier This Holiday Season; Teams with Krillion to Offer Product Information Online at Popular Retailer Locations" Telecommunications Weekly (Atlanta), Dec. 31, 2008: 9 . (Year: 2008).

Anon., The Joan and Irwin Jacobs Technion-Cornell Innovation Institute; Patent Application Titled 'Inventory Management System and Method Thereof' Published Online (USPTO 20160140490), Electronics Newsweekly (Atlanta) Jun. 7, 2016: 1733 (Year: 2016).

Anon., "NewsRx. Recent Findings from A. Rocha and Co-Authors Provide New Insights into Electronic Commerce (LDoW-PaN: Linked Data on the Web-Presentation and Navigation)," Internet Weekly News, Mar. 12, 2018; p. 553 (Year: 2018).

* cited by examiner

SYSTEMS AND METHODS FOR IDENTIFYING LOCATION-BASED INFORMATION ASSOCIATED WITH A PRODUCT ON A WEB PAGE

CROSS-REFERENCE TO RELATED APPLICATION(S)

This patent application is a continuation of and claims the benefit of priority to U.S. Nonprovisional patent application Ser. No. 16/695,752, filed on Nov. 26, 2019, the entirety of which is incorporated herein by reference.

TECHNICAL FIELD

Various embodiments of the present disclosure relate generally to product identification and, more particularly, to systems and methods for identifying location-based information associated with a product on a web page.

BACKGROUND

Local merchants are businesses based in a local geographic area of a respective customer. Local merchants, such as, for example, hobby shops, bookstores, hardware stores, gaming stores, or the like, may not have a large online presence. As such, shoppers may not be able to purchase items from the local merchants online and/or the local merchants may not appear in search engine search results. Further, it may be difficult for some local merchants to keep an up-to-date inventory list online of products currently in stock at the local merchant. For example, some types of local merchants, such as hobby shops, may not always have certain products in stock. Further, the inventory list of products in stock may be constantly changing due to customer demand of certain products.

Many shoppers today may purchase products online via the Internet and the purchased products may be shipped to the shoppers. Some shoppers may utilize a technique called showrooming in which the shoppers may visit local merchants to browse for products and then buy those products online from another merchant. For example, the shoppers may use their mobile phones to comparison shop while in the local merchant to find deals on products at larger merchants. However, some shoppers may desire to browse for products online and then purchase the products from a local merchant. For example, some shoppers may have a desire to support local businesses. Further, some shoppers may see a product online and may desire to purchase the product immediately from a local merchant rather than waiting for the product to be shipped.

The systems and methods of the present disclosure may solve one or more of the problems set forth above and/or other problems in the art. The scope of the current disclosure, however, is not defined by the attached claims, and not by the ability to solve any specific problem. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for identifying location-based information associated with a product on a web page. Each of the examples disclosed herein may include one or more of the features described in connection with any of the other disclosed examples.

In one embodiment, a computer-implemented method for identifying location-based information associated with a product on a web page is disclosed. The computer-implemented method may include: detecting, by one or more processors, user navigation by the user of the web page, wherein the web page is associated with at least one product; detecting, by the one or more processors, the at least one product on the web page; identifying, by the one or more processors, one or more merchants having the detected at least one product in stock; determining, by the one or more processors, a user location of the user; determining, by the one or more processors, the identified one or more merchants having the detected at least one product in stock and having a location within a predetermined distance of the user location; generating, by the one or more processors, a list of merchants, the list including the determined one or more merchants having the detected at least one product in stock and having the location within the predetermined distance of the user location; and executing, by the one or more processors, a browser extension to display, on the web page associated with the at least one product, the generated list of merchants.

In another embodiment, a computer-implemented method for identifying location-based information associated with a product on a web page is disclosed. The computer-implemented method may include: receiving, by one or more processors, a request from the user via a browser extension to identify location-based information associated with the product on the web page; when the request is received, detecting, by the one or more processors, at least one product on the web page; identifying, by the one or more processors, one or more merchants having the detected at least one product in stock; determining, by the one or more processors, a user location of the user; determining, by the one or more processors, the identified one or more merchants having the detected at least one product in stock and having a location within a predetermined distance of the user location; generating, by the one or more processors, a list of merchants, the list including the determined one or more merchants having the detected at least one product in stock and having the location within the predetermined distance of the user location; and executing, by the one or more processors, the browser extension to display, on the web page, the generated list of merchants.

In yet another embodiment, a computer-implemented method for identifying location-based information associated with a product on a web page is disclosed. The computer-implemented method may include: detecting, by one or more processors, user navigation by the user of the web page, the web page being associated with at least one product; detecting, by the one or more processors, the at least one product on the web page; determining, by the one or more processors, products that one or more merchants are likely to have in stock; comparing, by the one or more processors, the detected at least one product to the determined products that the one or more merchants are likely to have in stock; and based on the comparing, identifying, by the one or more processors, the one or more merchants likely to have the detected at least one product in stock; determining, by the one or more processors, a user location of the user; determining, by the one or more processors, the identified one or more merchants likely to have the detected at least one product in stock and having a location within a predetermined distance of the user location; generating, by the one or more processors, a list of merchants, the list including the determined one or more merchants likely to have the detected at least one product in stock and having the location within the predetermined distance of the user location; and executing, by the one or more processors, a browser extension to display, on the web page associated with the at least one product, the created list of merchants.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
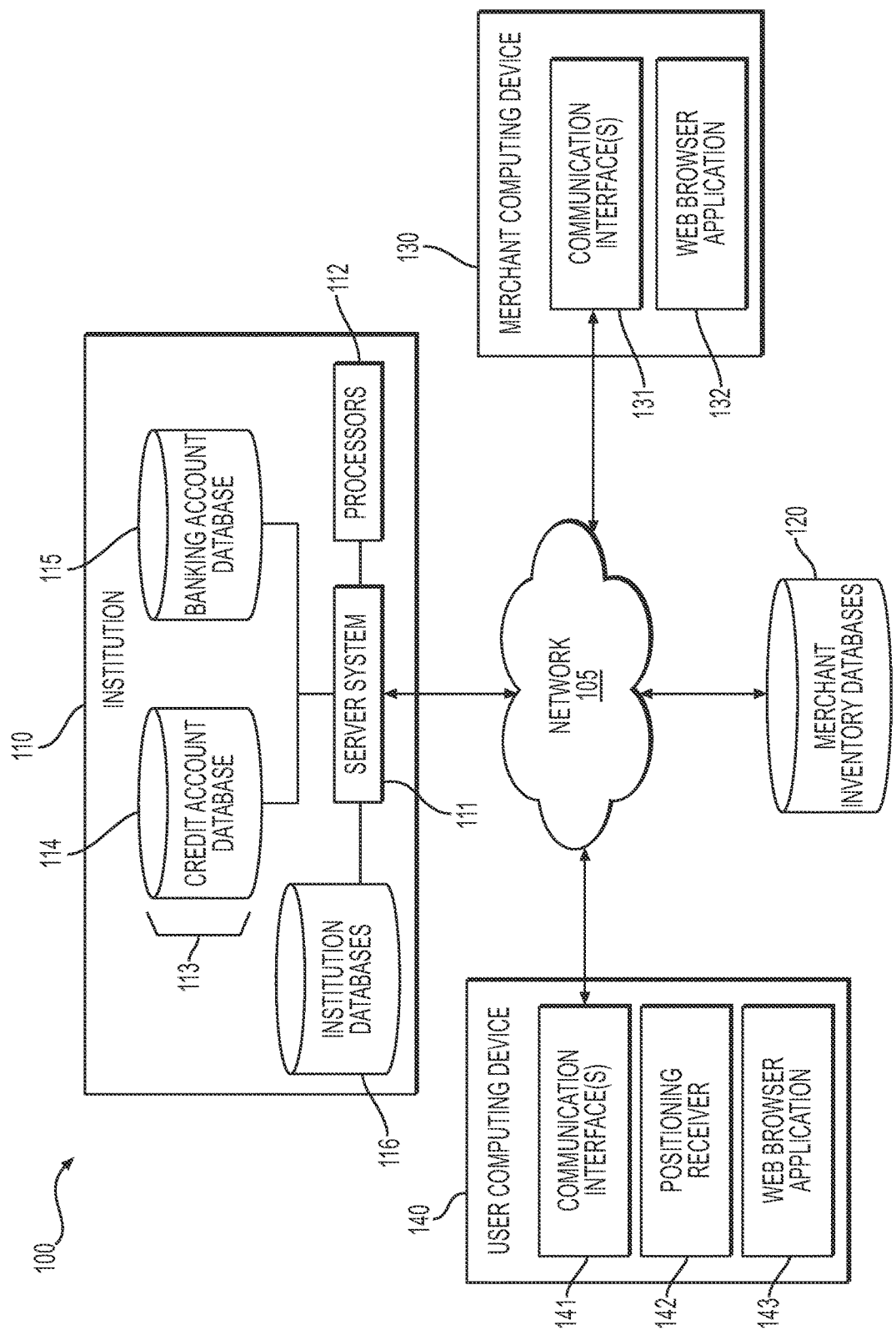
FIG. 1 depicts an exemplary system architecture for identifying location-based information associated with a product on a web page, according to one or more embodiments.

Various embodiments of the present disclosure relate generally to product identification and, more particularly, to systems and methods for identifying location-based information associated with a product on a web page.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure provides for systems and methods for identifying location-based information associated with a product on a web page. Embodiments of the present disclosure may provide for a browser extension that may recognize when a user is on a product web page. The browser extension may receive a product identifier for the product. For example, the product identifier may include a brand name, a product name, price information for the product, an International Standard Book Number (ISBN), and/or a product ID. The browser extension may also receive product variants for the product. The product variants may include description information of the product, such as, product size, product color, device memory, book edition, or any other description information about a product and/or service, as desired. The browser extension may send the identifier (and/variant) to a server, such as a financial institution server. The server may compare the product (via the identifier and/or variant) to inventory lists of various merchants. If the product matches a product in the inventory lists of any of the merchants, the server may determine which of the matching merchants are within predetermined distance from the user's location. The predetermined distance may be, for example, a certain mile radius (e.g., 1 mile, 2 mile, 5 mile, 10 mile, 25 mile, etc.). The user's location may be obtained by receiving the user's account information associated with the browser extension. The user's location may also be obtained from an IP address of the user and/or received from geolocation device (e.g., GPS device) associated with a mobile computer, such as a cellular phone. A list of the matching merchants within the predetermined distance may be sent back to the browser extension. The browser extension may then display a pop-up user interface (UI) including the list of matching merchants.

FIG. 1 is a diagram depicting an exemplary system environment 100 for identifying location-based information associated with a product on a web page, according to embodiments of the present disclosure. As shown in FIG. 1, system environment 100 may include institution 110 (e.g., a financial service provider) having one or more server systems 111 (e.g., financial service provider server systems) and one or more databases, such as user account databases 113 and institution databases 116. Server system 111 may include computing systems, such as system 500 described with respect to FIG. 5. As such, server system 111 may include one or more processors and a memory for storing and executing applications or software modules of system environment 100. For example, server system 111 may include one or more software modules to communicate with user devices through a network 105, such as the Internet. Further, the one or more processors may be configured to access the memory and execute processor-readable instructions, which when executed by the processor configures the processor to perform a plurality of functions of the system environment 100. For example, the one or more processors may include one or more processors 112 for identifying location-based information associated with a product on a web page, as detailed further below.

User account databases 113 may include one or more databases of institution 110 and may include credit account database 114 and banking account database 115. Credit account database 114 and banking account database 115 may be provided in a shared database (e.g., a single database) or as one or more separate databases. Databases 114, 115 may store industry information including credit usage information (via credit account database 114) or banking information (via banking account database 115). Specifically, credit account database 114 may store data representative of the purchase history of a user having one or more credit and/or banking accounts. The purchase history of the user may include receipt information of transactions made by the user at one or more merchants. For example, the receipt information may include one or more products purchased by the user from a respective merchant and an amount paid for each product purchased (e.g., using a credit card). Banking account database 115 may store similar data that is obtained from a banking account of the first user when, for example, a bank account debit card is used to make a purchase. Databases 114, 115 may also store data representative of the purchase history (e.g., receipt information) of other users having one or more credit and/or banking accounts.

System environment 100 may also include one or more merchant inventory databases 120 that may contain or store inventory information of one or more merchants. For example, the one or more merchant inventory databases 120 may contain one or more lists of various products that each respective merchant currently has in stock or likely has in stock, as detailed further below. It is understood that the one or more merchant inventory databases 120 may be provided as separate databases, one or more shared databases, and/or may be provided at institution 110. The one or more processors 112 may access user account database 113 and the one or more merchant inventory databases 120 (via network 105) to obtain and receive the receipt information and the merchant inventory information, respectively, as detailed further below. Merchant inventory database 120 may also store information identifying the one or more merchants. For example, the merchant inventory database 120 may store merchant name, address information, telephone number, website URL, hours of operation, etc. for each of the one or more merchants.

As further shown in FIG. 1, system environment 100 may include user devices, such as a merchant computing device 130 and a user computing device 140. Merchant computing device 130 and user computing device 140 may be in communication with each other and with server system 111 via network 105.

Merchant computing device 130 may be a computer system, such as a desktop computer, mobile computer, and/or cellular phone, that is operated by a merchant (e.g., employees of the merchant). Merchant computing device 130 may include a memory, one or more processors, communication interfaces, input devices, and output devices, as detailed further below with reference to FIG. 5. Merchant computing device 130 may include one or more communication interfaces 131 and a web browser application 132. Communication interface 131 may include one or more cellular radios, Bluetooth, WIFi, near-field communication radios, or other appropriate communication devices for transmitting and receiving information. As can be seen in FIG. 1, communication interface 131 facilitates communication between network 105 and merchant computing device 130. Multiple communication interfaces 131 may be included in merchant computing device 130 providing multiple forms of communication between merchant computing device 130 and server system 111 and/or merchant inventory database 120 via network 105. For example, communication may be achieved with network 105 through wireless communication (e.g., WiFi, radio communication, etc.) and/or a wired data connection (e.g., a universal serial bus, an onboard diagnostic system, etc.) or other communication modes.

Figure 2:
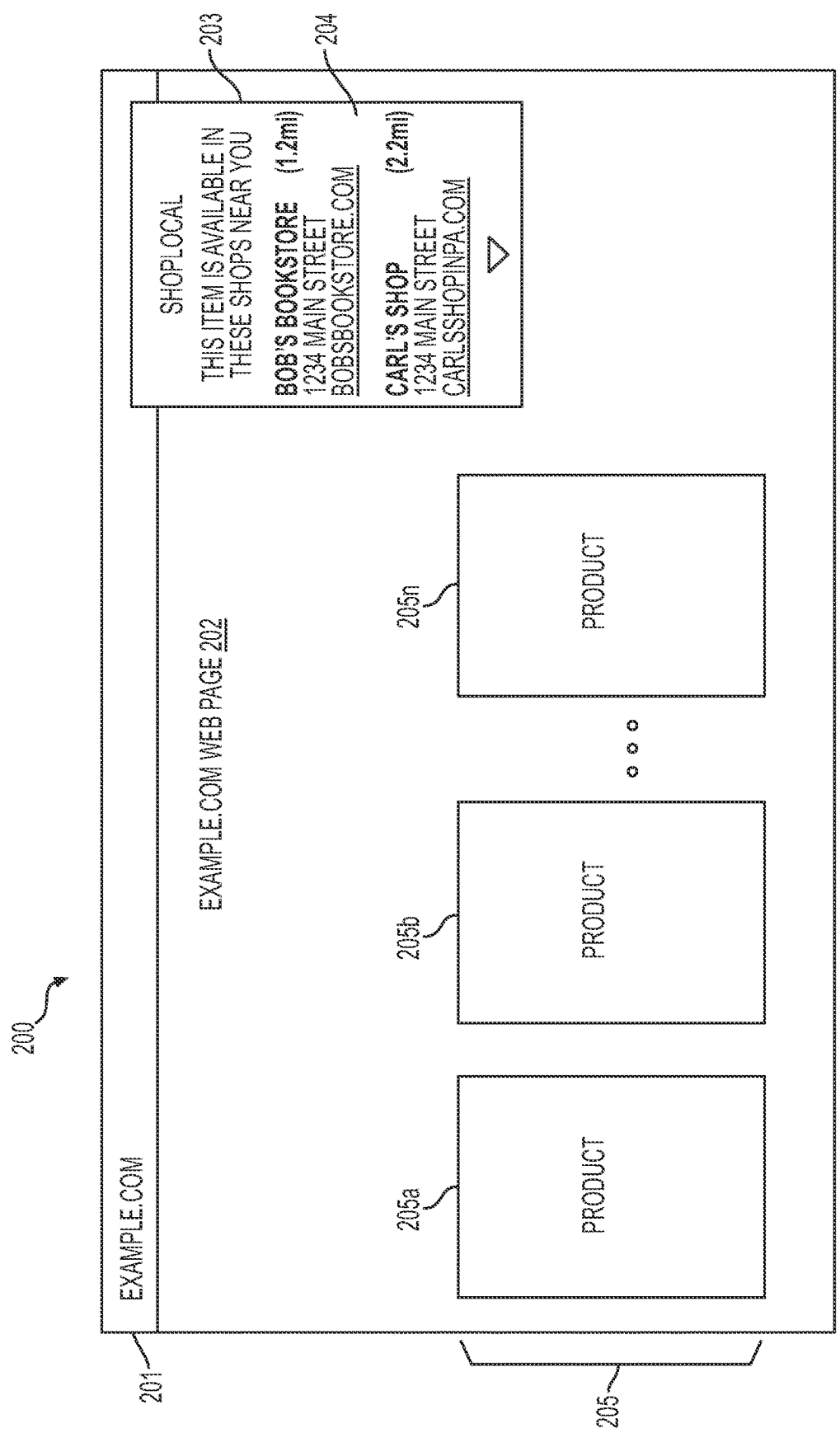
FIG. 2 depicts an exemplary user interface of a web browser application of the system architecture of FIG. 1.

Web browser application 132 may provide an interface 200 (as shown in FIG. 2) for accessing websites through network 105 (e.g., the Internet). Web browser application 132 may include a web browser, such as, for example, Internet Explorer®, Chrome®, Safari®, Edge®, or any other web browser known in the art. A merchant (e.g., an employee of the merchant) may upload an inventory list of products in stock for the merchant to merchant inventory database 120 via web browser application 132 through network 105. The one or more merchants may periodically upload the inventory list of products in stock to the merchant inventory database 120 via merchant computing device 130. For example, the one or more merchants may upload the inventory list of products in stock daily, weekly, bi-weekly, etc. The inventory list of products may be uploaded to merchant inventory database 120 manually by a merchant through web browser application 132. The inventory list of products in stock may also be automatically uploaded to merchant inventory database 120 (e.g., automatically pushed) periodically (e.g., at a set time daily, weekly, bi-weekly, monthly, etc.).

User computing device 140 may be a computer system, such as a computer, a mobile computer, or a cellular phone, that is operated by a user. User computing device 140 may include a memory, one or more processors, communication interfaces, input devices, and output devices, as detailed further below with reference to FIG. 5. User computing device 140 may include one or more communication interfaces 141, a positioning receiver 142, and a web browser application 143. Communication interface 141 may include one or more cellular radios, Bluetooth, WiFi, near-field communication radios, or other appropriate communication devices for transmitting and receiving information. As can be seen in FIG. 1, communication interface 141 facilitates communication between user computing device 140 and network 105. Multiple communication interfaces 141 may be included in user computing device 140 for providing multiple forms of communication between user computing device 140 and server system 111 via network 105. For example, communication may be achieved with network 105 through wireless communication (e.g., WiFi, radio communication, etc.) and/or a wired data connection (e.g., a universal serial bus, an onboard diagnostic system, etc.) or other communication modes.

User computing device 140 may further include hardware configured to sense (measure) and record location information when user computing device 140 is operated. For example, positioning receiver 142 may include, for example, a Global Positioning System receiver, or other geolocation device, configured to determine a user location of user computing device 140. Communication interface 141 may also measure user location based on data received from other satellite location systems or communication with a cell tower, for example. Positioning receiver 142 and communication interface 141 may independently or collaboratively measure and/or receive geographic location (e.g., user location) information (e.g., city/state/zip code/region) of user computing device 140. Alternatively, or additionally, a user may input the user location of the user via a web page or a browser extension 203, as detailed further below. User location may also be determined by processors 112 based on an IP address of the user computing device 140.

Web browser application 132 may provide an interface for accessing websites through network 105 (e.g., the Internet).

Web browser application 132 may include, for example, Internet Explorer®, Chrome®, Safari®, Edge®, or any other web browser known in the art. Web browser application 143 may also have a browser extension 203, or other code or library extensions, installed to identify location-based information associated with a product 205 on a web page 202. Browser extensions may be small software modules for customizing web browser application 143. In some embodiments, browser extension 203 may include a share extension and/or an action extension. As used herein, a "share extension" is an extension that enables users to share information from the current context (e.g., current web page 202) with other applications, extensions, social media accounts, and/or other services. Further, an "action extension" is an extension that enables users to initiate content-specific tasks, such as adding a bookmark, copying a link, or saving an image. The share extensions and action extensions may be, for example, extensions of a mobile computer, such as a cellular phone. Web browser application 143 may display a user interface 200 including a web page 202, as detailed with respect to FIG. 2 below. User computing device 140 may also include means for interacting with web page 202. For example, user computing device 140 may include one or more devices connected to input ports 550, such as, for example, a keyboard, mouse, touchscreen, etc.

FIG. 2 depicts an exemplary user interface 200 of web browser application 143. User interface 200 may be displayed in web browser (e.g., web browser application 143) or may be another application implemented on user computing device 140 and may include web page 202. User interface 200 may also include the browser extension 203 for identifying location-based information associated with a product 205 on a web page 202. As shown in FIG. 2, user interface 200 may include an address bar 201, web page 202, browser extension 203, extension interface 204, and at least one product 205. Address bar 201 may display a Uniform Resource Locator (URL). For example, the address bar 201 may display a URL for the web page 202. The web page 202 may be a product web page of an online merchant, such as, for example, Amazon®. The web page 202 may also include more than one product 205 (e.g., a first product 205a, a second product 205b, and an nth product 205n). It is understood that the web page 202 may be any web page associated with at least one product 205.

The at least one product 205 may include, for example, a first product 205a, a second product 205b, and/or an nth product 205n, and may include any number of products 205 on the web page 202. The at least one product 205 may include various images, words, and/or videos displayed on the web page 202 and may be associated with at least one product that the user desires to purchase from a local merchant (e.g., from a merchant within a predetermined distance of the user location that has the product 205 in stock).

Extension interface 204 may display notifications and/or a list of merchants having, or likely to have, the at least one product 205 in stock, as detailed further below. Extension interface 204 may further display location-based information for each merchant in the list of merchants. The location-based information may include, for example, name, address information, phone number, website, and/or distance from the user location for each merchant in the list of merchants. As depicted in FIG. 2, the exemplary user interface 200 indicates that the user is on a web page 202, "EXAMPLE-.COM," and the web page 202 may be displaying images of products 205. For example, each product 205 on the web page 202 may be an image of a book and each product 205a-n may include different books.

The browser extension 203 (via processors 112) may detect the at least one product 205 displayed on the web page 202 and display (e.g., via extension interface 204) a list of merchants having, or likely to have, the at least one product 205 in stock. For example, the one or more processors 112 may use image, text, and/or video recognition to identify the images, words, and/or videos and detect the at least one product 205 in the identified images, words, and/or videos. In one embodiment, the processors 112 may receive one or more cues from the user within the web page 202 to detect the at least one product 205 on the web page 202. For example, the user may highlight one or more words, images, and/or videos (e.g., via an input device on user computing device 140) associated with the at least one product 205 on the web page 202 and the browser extension 203 (e.g., the processors 112) may detect the highlighted words, images, and/or videos.

Browser extension 203 may also include another interface (not shown) that includes a search field (e.g., a search bar) to enable a user to input text to browser extension 203. For example, the user may input text describing the at least one product 205 into a search field of the browser extension 203 and the processors 112 may receive the input text to detect the at least one product 205 on the web page 202.

In some instances, browser extension 203 may not be able to identify an exact match of words, images, and/or videos of the product 205 on web page 202. As such, browser extension 203 (via processors 112) may include fuzzy matching. As used herein, "fuzzy matching" is a technique that allows processors 112 to identify a match when the match is not an exact match (e.g., <100% match). For example, processors 112 may use fuzzy matching to find correspondences between segments of a text (e.g., keywords, highlighted words or images, and/or input text) and entries (e.g., products 205) in the databases 113, 116, 120. As such, if a keyword, highlighted word, image, video, or input text does not match exactly to keywords, highlighted words, images, videos, or text associated with the at least one product 205, processors 112 may still be able to detect the at least one product 205 on the web page 202.

Another interface (not shown) of browser extension 203 may enable the user to input settings for the browser extension 203. For example, settings for browser extension 203 may include, for example, a predetermined distance, the user location, groups of other users, preferences for which merchants to display (e.g., via extension interface 204) in the list of merchants having the at least one product 205 in stock, or any other settings for browser extension 203. The preferences for which merchants to display may include, for example, merchants at which the user has transacted with previously based on the purchase history in user account databases 113 associated with the user. The preferences may also include merchants at which other users associated with the user have transacted with previously based on the purchase history in user account databases 113 associated with the other users. The other users may include, for example, friends or family of the user. Browser extension 203 may also include an interface for enabling the user to set groups of other users for displaying merchants in the list of merchants that the other users have transacted with previously. It is understood that the interfaces of browser extension 203 may be provided as separate interfaces, on a single interface, and/or may include combinations of interfaces. Further, the interfaces of browser extension 203 may be provided as a separate pop up over web page 202 and/or may be provided as a separate web page 202 in web browser application 143.

Server system 111 may further store one or more premade templates (not shown) in databases 116. For example, the premade templates may each include products that are typically listed on a specific type of web page 202. Further, the premade templates may provide a template for a web page 202 of a large merchant web site having product listings in a specific and/or common orientation on the web page 202. For example, the premade templates may include a template for Amazon® and the template may include a layout corresponding to a typical layout of a product web page 202 on the Amazon® web site. Thus, the browser extension 203 (via the processors 112) may detect the at least one product 205 on the web page 202 by matching the premade template to the web page 202.

In one embodiment, the web page 202 may include intelligent tags in a Hypertext Markup Language (HTML) code of the web page 202. The browser extension 203 (via processors 112) may receive the intelligent tags to detect the at least one product 205 on the web page 202. For example, the one or more intelligent tags may include identifier information of the at least one product 205 on the web page 202. The identifier information may include, for example, brand name, product name, price, International Standard Book Number (ISBN), and/or product identification (ID). The intelligent tags may also include product variants for the product. The product variants may include description information of the product, such as, product size, product color, device memory, book edition, or any other description information about a product and/or service, as desired.

The browser extension 203 (via processors 112) may also determine products that the one or more merchants likely have in stock. For example, the processors 112 may identify categories of types of products 205 (e.g., strategy board games, books, hobby supplies, etc.) that a respective merchant sells. The processors 112 may then estimate products 205 that the respective merchant likely has in stock based on the identified categories of types of products 205 that each respective merchant sells. In one embodiment, the processors 112 may also receive a survey from a respective merchant including a list of products that the respective merchant sells and a pricing scheme for the list of products. The survey may include, for example, information regarding categories of products 205 that the respective merchant sells. The survey may also include a list of products that the respective merchant always keeps in stock. The processors 112 may then estimate products 205 that the respective merchant likely has in stock based on the survey.

In one embodiment, the processors 112 may receive receipt information from one or more customer account databases 113, such as databases 114, 115. For example, the receipt information may include products 205 previously purchased by a respective customer from the one or more merchants. The processors 112 may then estimate products 205 that the one or more merchants are likely to have in stock based on the received receipt information from the one or more customer account databases 113.

Processors 112 may store a list of the estimated products 205 that the one or more merchants are likely to have in stock in merchant inventory database 120. Browser extension 203 may also display a recommended action for contacting the merchant that likely has the product 205 in stock. For example, extension interface 204 may display a message that the product 205 is likely to be in stock at the respective merchant. The recommended action may include, for example, calling the merchant, emailing the merchant, or otherwise contacting the merchant. The recommended action may also include providing directions to the merchant. For example, the user may select a merchant from the list of merchants and browser extension 203 (e.g., via processors 112) may provide directions to the selected merchant. Browser extension 203 may also generate an automated request for the user to request the merchant that likely has the product 205 in stock to contact the user.

Figure 3:
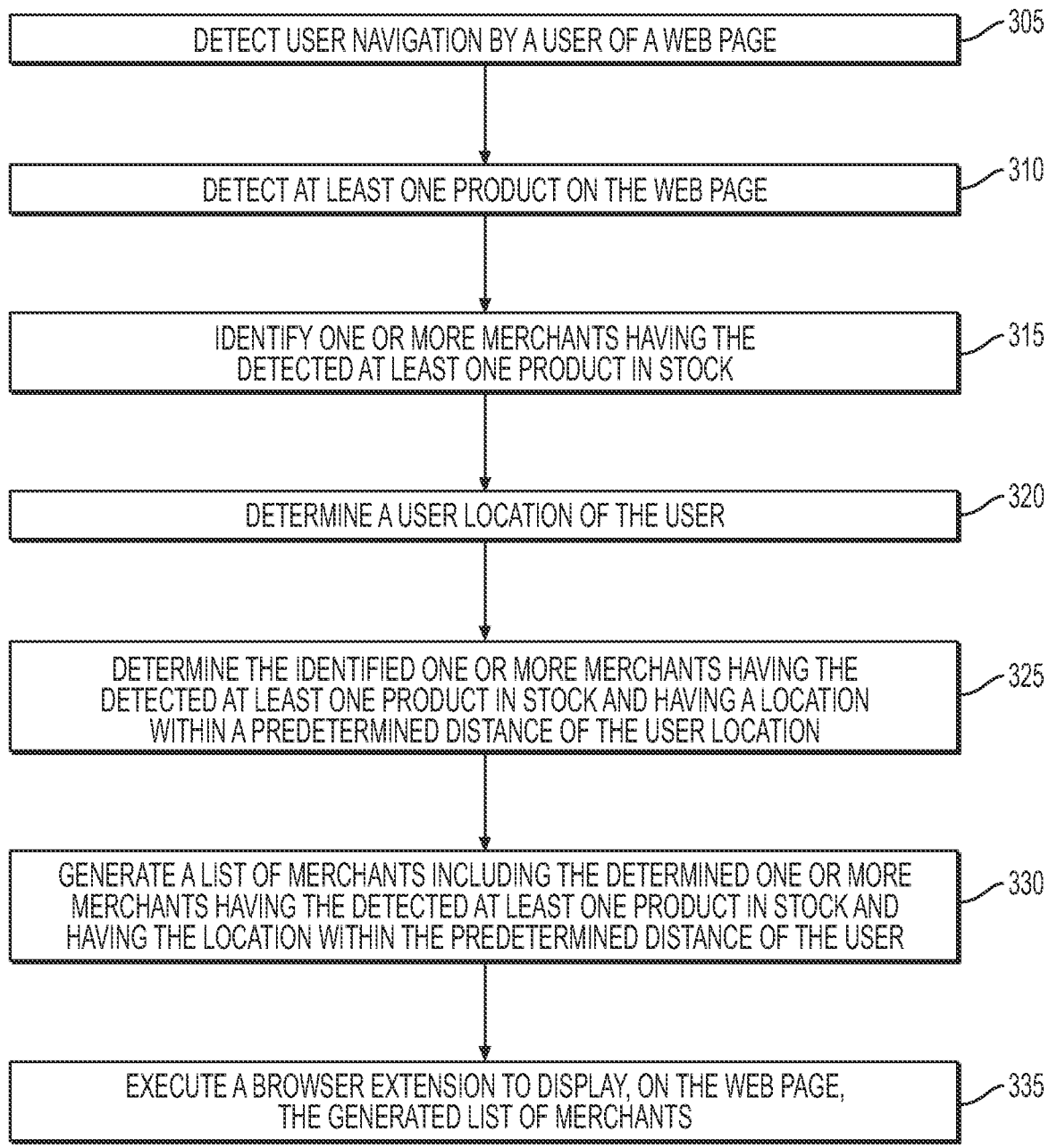
FIG. 3 depicts a flowchart of an exemplary method for identifying location-based information associated with a product on a web page.

FIG. 3 depicts a flowchart of an exemplary method 300 for identifying location-based information associated with a product 205 on a web page 202, according to another embodiment. In an initial step 305, the one or more processors 112 may detect user navigation by the user of the web page 202. For example, the browser extension 203 (via processors 112) may automatically detect user navigation of the web page 202 (e.g., via the URL of the web page 202). In some embodiments, the browser extension 203 (via processors 112) may detect user navigation of the web page 202 based on user input. For example, the user may navigate to the web page 202 and then may activate the browser extension 203 and the browser extension 203 (via processors 112) may detect user navigation of the web page 202 after the user has activated the browser extension 203.

In step 310, the one or more processors 112 may detect the at least one product 205 on the web page 202. For example, the processors 112 may identify keywords on the web page 202 associated with the at least one product 205. The processors 112 may also identify the images, words, and/or videos associated with at least one product 205 on the web page 202. In one embodiment, the processors 112 may match the one or more premade templates to the web page 202 to detect the at least one product 205 on the web page 202. In one embodiment, the processors 112 may receive the one or more intelligent tags in the Hypertext Markup Language (HTML) code of the web page 202 to detect the at least one product 205 on the web page 202. For example, the one or more intelligent tags may include identifier information of the at least one product 205 on the web page 202.

In step 315, the one or more processors 112 may identify one or more merchants having the detected at least one product 205 in stock. For example, the processors 112 may receive an inventory list of products in stock from the one or more merchants periodically. For example, the processors 112 may access the merchant inventory database 120 to receive the inventory list of products in stock from the one or more merchants. The processors 112 may then compare the detected at least one product 205 to the received inventory list of products in stock. Based on the comparing, the processors 112 may identify the one or more merchants having the detected at least one product 205 in stock. For example, the processors 112 may determine that the detected at least one product 205 matches (or matches within a permissible deviation) at least one product on the inventory list of products in stock from one or more of the one or more merchants.

In one embodiment, the processors 112 may determine products that the one or more merchants likely have in stock. For example, the processors 112 may identify categories of types of products that a respective merchant sells. The processors 112 may then estimate products that the respective merchant likely has in stock based on the identified categories of types of products that each respective merchant sells. In one embodiment, the processors 112 may also receive a survey from a respective merchant including a list of products that the respective merchant sells and a pricing scheme for the list of products. The processors 112 may then estimate products that the respective merchant likely has in stock based on the survey. In one embodiment, the processors 112 may receive receipt information from one or more customer account databases 113 associated with the user and/or with other users. For example, the receipt information may include products purchased by a respective customer from the one or more merchants. The processors 112 may then estimate products that the one or more merchants are likely to have in stock based on the received receipt information from the one or more customer account databases 113.

In one embodiment, after the processors 112 have determined the products that the one or more merchants are likely to have in stock, the processors 112 may compare the detected at least one product 205 to the determined products that the one or more merchants are likely to have in stock. Based on the comparing, the processors 112 may identify the one or more merchants likely to have the detected at least one product 205 in stock. For example, the processors 112 may identify the one or more merchants likely to have the detected at least one product 205 in stock if the detected at least one product 205 matches at least one product of the determined products that the one or more merchants are likely to have in stock.

In step 320, the one or more processors 112 may determine a user location of the user. In one embodiment, the processors 112 may receive input of the user location from the user via the browser extension 203. In one embodiment, the processors 112 may determine the user location based on an IP address received via user computing device 140 (e.g., through web browser application 143). In one embodiment, the processors 112 may receive the user location of the user via a geolocation device associated with the user computing device 140, such as positioning receiver 142.

In step 325, the one or more processors 112 may determine the identified one or more merchants having the detected at least one product 205 in stock and having a location within a predetermined distance of the user location. For example, the predetermined distance may be input to the browser extension 203 by the user via user computing device 140. The predetermined distance may include a radius from the user location, such as, for example, 1 mile, 2 miles, 5 miles, 10 miles, 25 miles, etc. As such, the processors 112 may determine the one or more merchants having the detected at least one product 205 in stock and having a location (e.g., based on the address information of the one or more merchants) within the predetermined distance of the user location. It is understood that the predetermined distance may include any distance and any units of distance. Further, the predetermined distance may be preset in the browser extension 203 and may include a default predetermined distance.

In step 330, the one or more processors 112 may generate a list of merchants. The list may include the determined one or more merchants having the detected at least one product 205 in stock and having the location within the predetermined distance of the user location. In some embodiments, the user may filter the list of merchants to create a filtered list of merchants. For example, the list of merchants may be filtered by hours of operation, distance from the user, whether the merchant is capable of delivering the product 205, or any other filters may be applied to filter the list of merchants.

In step 335, the one or more processors 112 may execute the browser extension 203 to display, on the web page 202 associated with the at least one product 205, the generated list of merchants. For example, the processors 112 may display via the browser extension 203 (e.g., through extension interface 204) on the web page 202, that the detected at least on product 205 is in stock or likely in stock at each merchant in the list of merchants. Further, the processors 112 may display (e.g., via extension interface 204) at least one of: hours of operation, telephone number, address information, a website for each merchant on the list of merchants, and/or whether the merchant is capable of delivering the product 205. The processors 112 may also display a distance to each merchant on the list of merchants from the user location (as shown by extension interface 204 in FIG. 2). In one embodiment, the processors 112 may determine merchants from the list of merchants that the user has transacted with previously and display just those merchants on the browser extension 203 (e.g., via extension interface 204). In one embodiment, the processors 112 may determine merchants from the list of merchants that other users associated with the user have transacted with based on receipt information in one or more customer account databases 113 associated with the other users. Thus, the processors 112 may display (e.g., via extension interface 204) the merchants from the list of merchants that the other users have transacted with previously.

Figure 4:
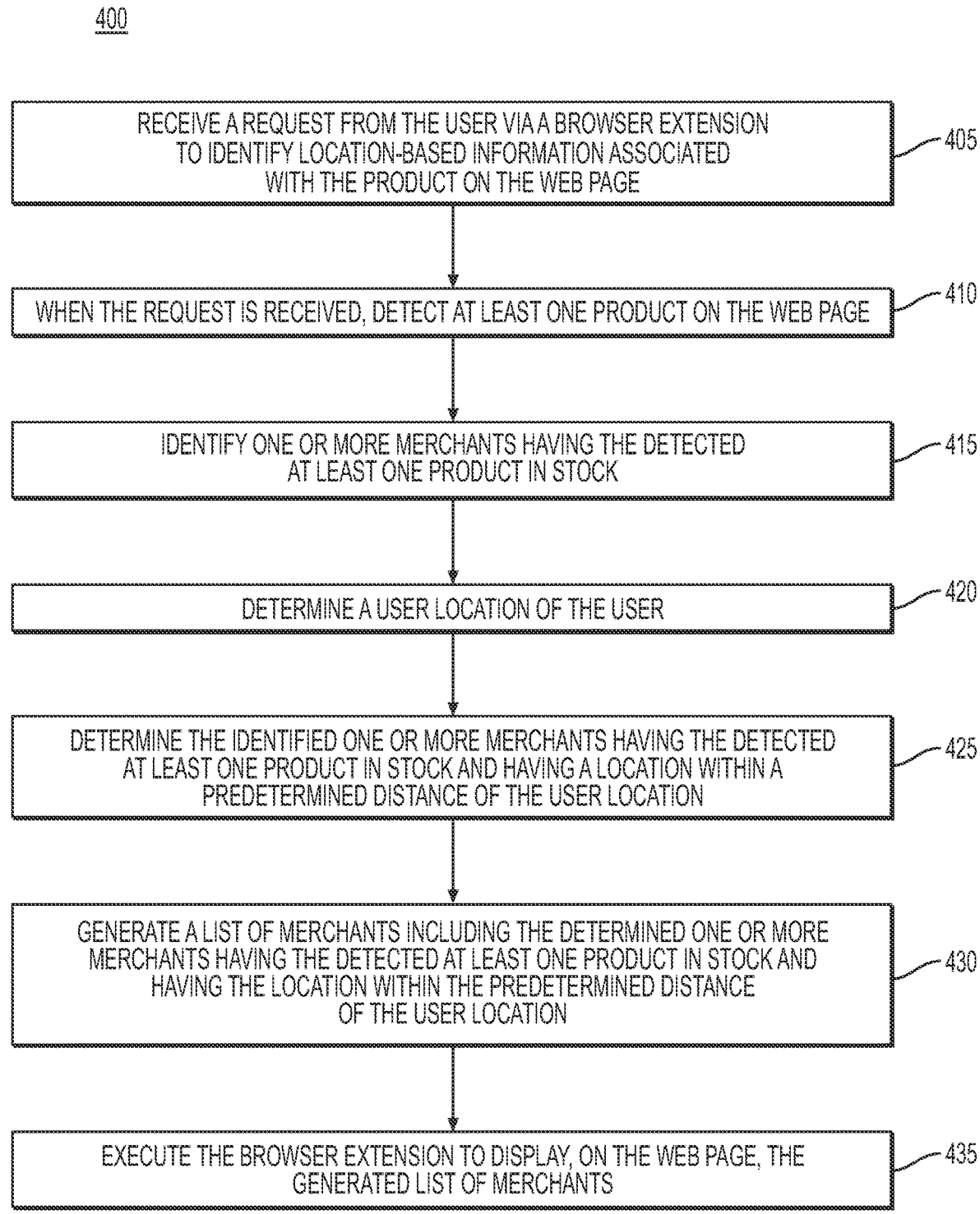
FIG. 4 depicts a flowchart of another exemplary method for identifying location-based information associated with a product on a web page.

FIG. 4 depicts a flowchart of an exemplary method 400 for identifying location-based information associated with a product 205 on a web page 202, according to one or more embodiments, and may be performed in the exemplary system environment 100 of FIG. 1. In an initial step 405, the one or more processors 112 may receive a request from the user via browser extension 203 to identify location-based information associated with a product 205 on the web page 202.

In step 410, when the request is received, the one or more processors 112 may detect at least one product 205 on the web page 202.

In step 415, the one or more processors 112 may identify one or more merchants having the detected at least one product 205 in stock.

In step 420, the one or more processors 112 may determine a user location of the user.

In step 425, the one or more processors 112 may determine the identified one or more merchants having the detected at least one product 205 in stock and having a location within a predetermined distance of the user location.

In step 430, the one or more processors 112 may generate a list of merchants. The list may include the determined one or more merchants having the detected at least one product 205 in stock and having the location within the predetermined distance of the user location.

In step 435, the one or more processors 112 may execute the browser extension to display, on the web page 202 (e.g., via extension interface 204), the generated list of merchants.

Figure 5:
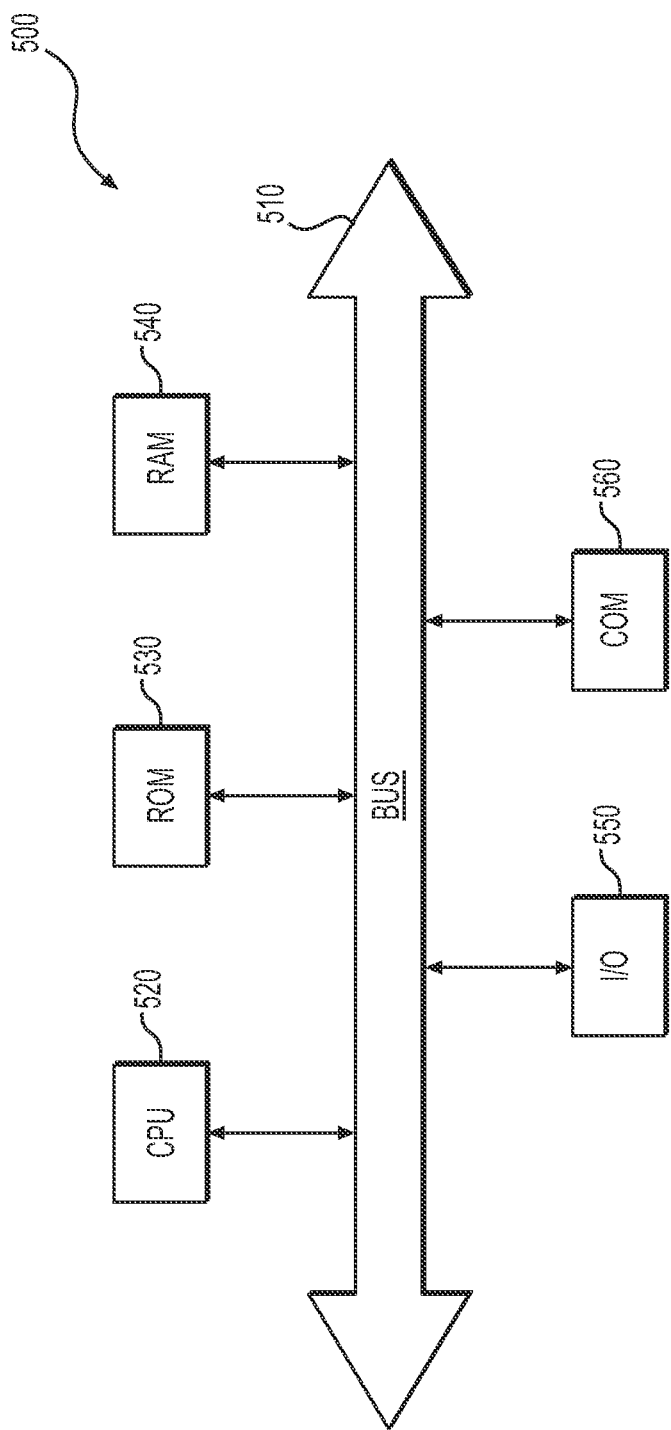
FIG. 5 depicts an example system that may execute techniques presented herein.

FIG. 5 depicts an example system 500 that may execute techniques presented herein. FIG. 5 is a simplified functional block diagram of a computer that may be configured to execute techniques described herein, according to exemplary embodiments of the present disclosure. Specifically, the computer (or "platform" as it may not a be a single physical computer infrastructure) may include a data communication interface 560 for packet data communication. The platform also may include a central processing unit ("CPU") 520, in the form of one or more processors, for executing program instructions. The platform may include an internal communication bus 510, and the platform also may include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for identifying location-based information associated with a product on a web page, the computer-implemented method comprising:
receiving, by one or more processors, user navigation of the web page from a user device;
detecting, by the one or more processors, at least one product on the web page;
identifying, by the one or more processors, one or more merchants having the detected at least one product in stock;
determining, by the one or more processors, a user location of the user;
determining, by the one or more processors, the identified one or more merchants having the detected at least one product in stock and having a location within a predetermined distance of the user location;
generating, by the one or more processors, a list of merchants, the list including the determined one or more merchants having the detected at least one product in stock and having the location within the predetermined distance of the user location, the list of merchants further including merchants that other users associated with the user have transacted with based on receipt information in one or more customer account databases of the other users; and
causing, by the one or more processors, display of the generated list of merchants on the user device.

2. The computer-implemented method of claim 1, wherein the receiving, by the one or more processors, the user navigation of the web page includes:
receiving, by the one or more processors, input text in a search field describing the at least one product.

3. The computer-implemented method of claim 1, wherein the detecting, by the one or more processors, the at least one product on the web page includes at least one of:
   identifying, by the one or more processors, keywords on the web page associated with the at least one product; or
   receiving, by the one or more processors, one or more cues from the user within the web page for identifying the at least one product.

4. The computer-implemented method of claim 1, wherein the detecting, by the one or more processors, the at least one product on the web page includes at least one of:
   matching, by the one or more processors, one or more premade templates to the web page, the one or more premade templates including products that are typically listed on a specific type of web page; or
   receiving, by the one or more processors, one or more intelligent tags in an HTML code of the web page, the one or more intelligent tags including information of the at least one product on the web page.

5. The computer-implemented method of claim 1, wherein the determining, by the one or more processors, the user location of the user includes at least one of:
   receiving, by the one or more processors, an input of the user location from the user via the user device;
   determining, by the one or more processors, the user location based on an IP address of the user received via the user device; or
   receiving, by the one or more processors, the user location of the user via a geolocation device associated with the user device.

6. The computer-implemented method of claim 1, wherein the identifying, by the one or more processors, the one or more merchants having the detected at least one product in stock includes:
   receiving, by the one or more processors, an inventory list of products in stock from the one or more merchants periodically; and
   identifying, by the one more processors, the one or more merchants having the detected at least one product in stock based on the received inventory list.

7. The computer-implemented method of claim 1, wherein the identifying, by the one or more processors, the one or more merchants having the detected at least one product in stock includes:
   determining, by the one or more processors, products that the one or more merchants are likely to have in stock;
   comparing, by the one or more processors, the detected at least one product to the determined products that the one or more merchants are likely to have in stock; and
   based on the comparing, identifying, by the one or more processors, the one or more merchants likely to have the detected at least one product in stock.

8. The computer-implemented method of claim 7, wherein the determining, by the one or more processors, products that the one or more merchants are likely to have in stock includes at least one of:
   identifying, by the one or more processors, categories of types of products that a respective merchant sells and estimating, by the one or more processors, products that the respective merchant likely has in stock based on the identified categories of types of products that each respective merchant sells;
   receiving, by the one or more processors, a survey from a respective merchant including a list of products that the respective merchant sells and a pricing scheme for the list of products and estimating, by the one or more processors, products that the respective merchant likely has in stock based on the survey; or
   receiving, by the one or more processors, receipt information from one or more customer account databases associated with any user, the receipt information including products purchased by a respective customer from the one or more merchants and estimating, by the one or more processors, products that the one or more merchants are likely to have in stock based on the received receipt information from the one or more customer account databases associated with any user.

9. The computer-implemented method of claim 1, wherein the causing, by the one or more processors, display of the generated list of merchants on the user device includes:
   causing, by the one or more processors, display of an indication that the detected at least one product is in stock or likely in stock at each merchant in the list of merchants via the user device; and
   causing, by the one or more processors, display of at least one of: hours of operation, telephone number, address information, or a website for each merchant in the list of merchants via the user device.

10. The computer-implemented method of claim 1, wherein the causing, by the one or more processors, display of the generated list of merchants on the user device includes:
   causing, by the one or more processors, display of merchants from the list of merchants that the user has transacted with previously based on receipt information in one or more customer account databases associated with the user via the user device.

11. A computer-implemented method for identifying location-based information associated with a product on a web page, the computer-implemented method comprising:
   receiving, by one or more processors, a request from a user via a user device to identify location-based information associated with the product on the web page;
   when the request is received, detecting, by the one or more processors, at least one product on the web page by at least one of:
      matching, by the one or more processors, one or more premade templates to the web page, the one or more premade templates including products that are typically listed on a specific type of web page; or
      receiving, by the one or more processors, one or more intelligent tags in an HTML code of the web page, the one or more intelligent tags including information of the at least one product on the web page;
   identifying, by the one or more processors, one or more merchants having the detected at least one product in stock;
   determining, by the one or more processors, a user location of the user;
   determining, by the one or more processors, the identified one or more merchants having the detected at least one product in stock and having a location within a predetermined distance of the user location;
   generating, by the one or more processors, a list of merchants, the list including the determined one or more merchants having the detected at least one product in stock and having the location within the predetermined distance of the user location; and
   causing, by the one or more processors, display of the generated list of merchants on the user device.

12. The computer-implemented method of claim 11, further comprising: receiving, by the one or more processors, settings from user input on the user device, including at least one of: the predetermined distance, the user location, groups of other users, or preferences for which merchants to display in the list of merchants.

13. The computer-implemented method of claim 11, wherein the detecting, by the one or more processors, the at least one product on the web page includes at least one of:
   identifying, by the one or more processors, keywords on the web page associated with the at least one product; or
   receiving, by the one or more processors, one or more cues from the user within the web page for identifying the at least one product.

14. The computer-implemented method of claim 11, wherein the determining, by the one or more processors, the user location of the user includes at least one of:
   receiving, by the one or more processors, an input of the user location from the user via the user device;
   determining, by the one or more processors, the user location based on an IP address of the user received via the user device; or
   receiving, by the one or more processors, the user location of the user via a geolocation device associated with the user device.

15. The computer-implemented method of claim 11, wherein the identifying, by the one or more processors, the one or more merchants having the detected at least one product in stock includes:
   receiving, by the one or more processors, an inventory list of products in stock from the one or more merchants periodically; and
   identifying, by the one more processors, the one or more merchants having the detected at least one product in stock based on the received inventory list.

16. The computer-implemented method of claim 11, wherein the identifying, by the one or more processors, the one or more merchants having the detected at least one product in stock includes:
   determining, by the one or more processors, products that the one or more merchants are likely to have in stock;
   comparing, by the one or more processors, the detected at least one product to the determined products that the one or more merchants are likely to have in stock; and
   based on the comparing, identifying, by the one or more processors, the one or more merchants likely to have the detected at least one product in stock.

17. The computer-implemented method of claim 16, wherein the determining, by the one or more processors, products that the one or more merchants are likely to have in stock includes at least one of:
   identifying, by the one or more processors, categories of types of products that a respective merchant sells and estimating, by the one or more processors, products that the respective merchant likely has in stock based on the identified categories of types of products that each respective merchant sells;
   receiving, by the one or more processors, a survey from a respective merchant including a list of products that the respective merchant sells and a pricing scheme for the list of products and estimating, by the one or more processors, products that the respective merchant likely has in stock based on the survey; or
   receiving, by the one or more processors, receipt information from one or more customer account databases, the receipt information including products purchased by a respective customer at one or more merchants and estimating, by the one or more processors, products that the one or more merchants are likely to have in stock based on the received receipt information from the one or more customer account databases.

18. The computer-implemented method of claim 11, wherein the causing, by the one or more processors, display of the generated list of merchants on the user device includes:
   causing, by the one or more processors, display of an indication that the detected at least one product is in stock or likely in stock at each merchant in the list of merchants via the user device; and
   causing, by the one or more processors, display of at least one of: hours of operation, telephone number, address information, or a website for each merchant in the list of merchants via the user device.

19. The computer-implemented method of claim 11, wherein the causing, by the one or more processors, display of the generated list of merchants on the user device includes:
   causing, by the one or more processors, display of merchants from the list of merchants that the user has transacted with previously based on receipt information in one or more customer account databases associated with the user via the user device.

20. A computer-implemented method for identifying location-based information associated with a product on a web page, the computer-implemented method comprising:
   receiving, by one or more processors, user navigation of the web page from a user device;
   detecting, by the one or more processors, at least one product on the web page;
   determining, by the one or more processors, products that one or more merchants are likely to have in stock by at least one of:
      identifying, by the one or more processors, categories of types of products that a respective merchant sells and estimating, by the one or more processors, products that the respective merchant likely has in stock based on the identified categories of types of products that each respective merchant sells;
      receiving, by the one or more processors, a survey from a respective merchant including a list of products that the respective merchant sells and a pricing scheme for the list of products and estimating, by the one or more processors, products that the respective merchant likely has in stock based on the survey; or
      receiving, by the one or more processors, receipt information from one or more customer account databases, the receipt information including products purchased by a respective customer at one or more merchants and estimating, by the one or more processors, products that the one or more merchants are likely to have in stock based on the received receipt information from the one or more customer account databases;
   comparing, by the one or more processors, the detected at least one product to the determined products that the one or more merchants are likely to have in stock; and
   based on the comparing, identifying, by the one or more processors, the one or more merchants likely to have the detected at least one product in stock;
   determining, by the one or more processors, a user location of the user;
   determining, by the one or more processors, the identified one or more merchants likely to have the detected at least one product in stock and having a location within a predetermined distance of the user location;

generating, by the one or more processors, a list of merchants, the list including the determined one or more merchants likely to have the detected at least one product in stock and having the location within the predetermined distance of the user location; and causing, by the one or more processors, display of the generated list of merchants on the user device.

\* \* \* \* \*